United States Patent [19]

Evers et al.

[11] 3,917,869

[45] *Nov. 4, 1975

[54] 3-FURYL THIOESTERS TO IMPART MEATY AROMA AND TASTE

[75] Inventors: William J. Evers, Atlantic Highlands; Howard H. Heinsohn, Jr., Hazlet; Bernard J. Mayers, Cliffwood Beach; Elizabeth A. Karoll, Old Bridge, all of N.J.

[73] Assignee: International Flavors & Fragrances Inc., New York, N.Y.

[ * ] Notice: The portion of the term of this patent subsequent to Aug. 7, 1990, has been disclaimed.

[22] Filed: June 11, 1974

[21] Appl. No.: 478,369

Related U.S. Application Data

[63] Continuation-in-part of Ser. No. 386,451, Aug. 7, 1973, Pat. No. 3,873,731.

[52] U.S. Cl.......... 426/535; 260/347.2; 260/332.2 C
[51] Int. Cl.².......................................... A23L 1/231
[58] Field of Search.................. 260/347.2, 332.2 C; 426/65, 175

[56] References Cited
UNITED STATES PATENTS
3,666,495   5/1972   Evers et al. ........................ 426/65

FOREIGN PATENTS OR APPLICATIONS
1,283,912   8/1972   United Kingdom.................. 426/65

*Primary Examiner*—Joseph M. Golian
*Attorney, Agent, or Firm*—Arthur L. Liberman, Esq.; Harold Haidt, Esq.

[57] ABSTRACT

Methods for altering the organoleptic properties of foodstuffs comprising incorporating with such foodstuffs a small but effective amount of at least one 3-thia furan having the formula:

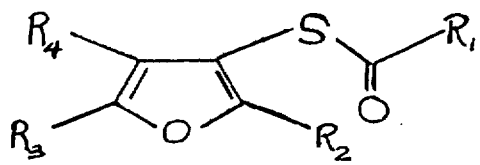

wherein $R_1$ is $C_1$–$C_7$ straight chain or branched chain alkyl or alkenyl; or $R_1$ is either furyl, thienyl, toluyl, phenyl ethenyl or phenyl; and wherein each of $R_2$, $R_3$ and $R_4$ is the same or different hydrogen or lower alkyl together with compositions containing the 3-thia furans for use in altering such organoleptic properties.

4 Claims, No Drawings

3-FURYL THIOESTERS TO IMPART MEATY AROMA AND TASTE

This application is a continuation-in-part of application for U.S. Pat. Ser. No. 386,451 filed on Aug. 7, 1973 and now U.S. Pat. No. 3,873,731.

BACKGROUND OF THE INVENTION

The present invention provides methods for altering the organoleptic properties of foodstuffs by adding to such foodstuffs quantities of one or more 3-thia furans and it further relates to compositions adapted to alter the organoleptic properties of foodstuffs.

Artificial flavoring agents for foodstuffs have received increasing attention in recent years. In many areas, such food flavoring agents are preferred overe natural flavoring agents at least in part because of the uniform flavor that may be so obtained. For example, natural food flavoring agents such as extracts, essences, concentrates and the like are often subject to wide variation due to changes in the quality, type and treatment of the raw materials. Such variation can be reflected in the end product and results in unreliable flavor characteristics and uncertainity as to consumer acceptance and cost. Additionally, the presence of the natural product in the ultimate food may be undesirable because of increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a difficult task since the magnetism for flavor development in many foods is not understood. This is noteable in products having meaty and roasted flavor characteristics. It is also noteable in products having vegetable-like and hydrolyzed vegetable protein-like and anise-like flavor characteristics.

Reproduction of roasted and meat flavors and aromas and vegetable-like and hydrolyzed vegetable protein-like and anise-like flavors and aromas have been the subject of the long and continuing search by those engaged in the production of foodstuffs. The severe shortage of foods, especially protein foods, in many parts of the world has given rise to the need for utilizing non-meat sources of proteins and making such proteins as palatable and as meat-like as possible. Hence, materials which will closely simulate or exactly reproduce the flavor and aroma of roasted meat products and liver products and vegetable products are required.

Moreover, there are a great many meat containing or meat based foods presently distributed in a preserved form. Examples being condensed soups, dry-soup mixes, dry meat, freeze-dried or lyophilized meats, packages gravies and the like. While these products contain meat or meat extracts, the fragrance, taste and other organoleptic factors are very often impaired by the processing operation and it is desirable to supplement or enhance the flavors of these preserved foods with versatile materials which have either roasted meat or gravy-like or vegetable-like or meat-like or ham-like nuances.

U.S. Pat. No. 3,666,495 provided materials having such desirable meat, roast meat and roasted fragrance and flavor notes. Such materials are organic oxygen containing heterocyclics wherein the second carbon atom from the oxygen atom contains a sulfur substituent and included 3-thia furan compounds having the structure:

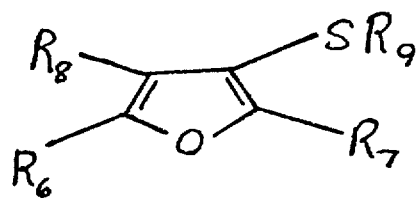

wherein $R_6$, $R_7$, $R_8$ and $R_9$ are the same or different alkyl or hydrogen. The process disclosed in this patent indicated that such furan 3-thiols and alkyl substituted furan 3-thiols can be produced by the reaction of an appropriate dihydro furanone-3- or tetrahydro furanone-3- with hydrogen sulfide in the presence of anhydrous hydrogen chloride at tempertures of $-60°C$ to $-100°C$.

South African Patent No. 69/4539 dated June 26, 1969 discloses, for use as intermediates for subsequent reaction with hydrogen sulfide to form flavor compounds, dihydro furyl thioesters having the structure:

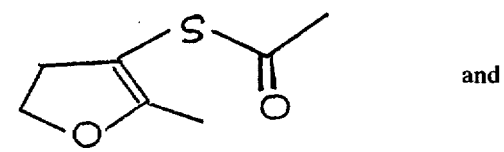

and

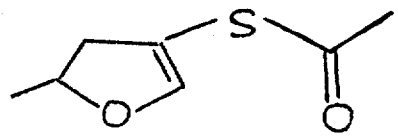

See pages 6 and 7 of the said South African Patent.

Volumn 24 "Food Technology" page 535 (May, 1970) [the "Gras IV" list No. 3162] discloses the use as a flavor adjuvant furfural S thioacetate having the structure:

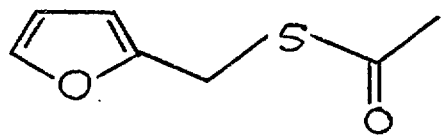

Nothing in the prior art, however, sets forth implicitly or explicitly the 3-furyl thioesters of our invention and their unique and advantageous and unobvious flavor properties.

2,5-dimethyl-3-thio(2-ethylbutyryl) furan
2-methyl-3-thio(2-ethylbutyryl) furan
2,5-dimethyl-3-thio(2-methylbutyryl) furan
2-methyl-3-thio(2-methylbutyryl) furan

THE INVENTION

The present invention provides methods for altering the organoleptic properties of foodstuffs which comprise adding to such materials at least one 3-thia furan. Briefly, the methods comprise adding an amount of at least one thia furan having the formula:

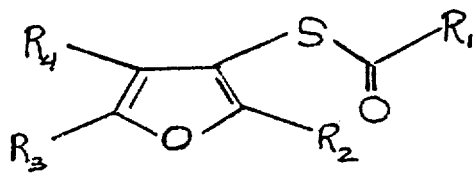

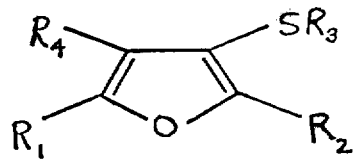

wherein $R_1$ is $C_1$–$C_7$ straight chain or branched chain alkyl or alkenyl or $R_1$ is furyl, thienyl, toluyl, phenyl ethenyl or phenyl; wherein each of $R_2$, $R_3$ and $R_4$ is the same or different hydrogen or lower alkyl to a foodstuff to change the organoleptic properties of said foodstuffs. The invention also contemplates compositions containing such 3-thia furan compounds.

Preferred 3-thia furans useful in our invention are as follows:

3-thio acetyl furan
2,5-dimethyl-3-thio acetyl furan
2-methyl-3-thio acetyl furan
2,5-dimethyl-4-ethyl-3-thio acetyl furan
2-methyl-3-thio isobutyryl furan
2,5-dimethyl-3-thio isobutyryl furan
2,5-dimethyl-3-thio isovaleryl furan
2-dimethyl-3-thio isovaleryl furan
2-methyl-3(2-thio furoyl) furan
2,5-dimethyl-3(2-thio furoyl) furan
2-methyl-3-thio octanoyl furan
2,5-dimethyl-3-thio octanoyl furan
2,5-dimethyl-3-thio benzoyl furan
2,5-dimethyl-3-thio propionyl furan
2-methyl-3-thio pivaloyl furan
2,5-dimethyl-3-thio pivaloyl furan
2,5-dimethyl-3-thio hexanoyl furan
2-propyl-3-thio acaetyl furan
2,5-dimethyl-3-thio(2-methyl-2-pentenoyl) furan
2,5-dimethyl-3-thio toluoyl furan
2,5-dimethyl-3-thio cinnamoyl furan
2,5-dimethyl-3-thio (2-methyl-2-pentenoyl) furan The novel compounds of our invention may be produced according to processes which comprise the steps of:

i. providing a 2-ene-1,4 dione having the structure

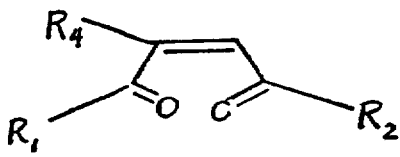

ii. intimately admixing said 2-ene-1,4 dione with a thio acid having the formula $R_3SH$ thereby providing a substituted or unsubstituted 2-thia substituted 1,4 dione having the structure

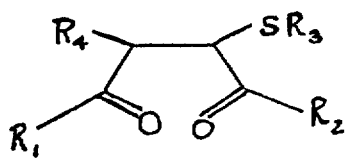

iii. cyclizing said 2-thia substituted 1,4 dione to form a substituted or unsubstituted 3-thia furan having the formula:

iv. optionally but only when $R_3$ is acyl or aroyl, hydrolyzing the 3-thia furan to form a 3-mercapto furan having the structure:

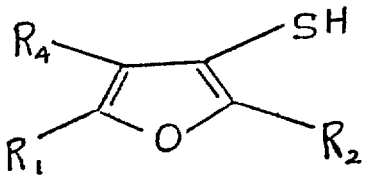

v. reacting the thus formed 3-mercapto furan with an acylating or aroylating agent thus forming a new acyl or aroyl 3-thia furan having the structure:

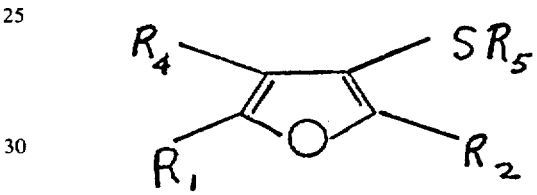

wherein $R_1$ is straight chain or branched chain alkyl or alkenyl having from 1 up to 7 carbon atoms or $R_1$ is either of furyl, thienyl, toluyl, phenyl ethenyl, or phenyl; wherein each of $R_2$, $R_3$ and $R_4$ is the same or different hydrogen or lower alkyl; wherein $R_3$ is acyl or aroyl; and wherein $R_5$ is acyl or aroyl different from $R_3$. $R_1$ or/and $R_2$ may each be hydrogen in the event that in step (ii) the 2-ene-1,4 dione is admixed with the thio acid having the formula $R_3SH$ in the presence of an organic base such as piperidine, pyridine, triethyl amine, quinoline or α-picoline or a mixture thereof.

The 2-ene-1,4 dione may be prepared by reacting 2,5-dialkoxy-2,5-dialkyl-2,5-dihydrofuran with a weak acid hydrolysis agent such as 1% aqueous acetic acid under reflux conditions. The resulting material will be in the case of starting with 2,5-dimethoxy-2,5-dimethyl-2,5-dihydrofuran, cis-3-hexen-2,5-dione.

The resulting 2-ene-1,4 dione is then reacted with a thio acid having the formula $R_3SH$ wherein $R_3$ is either aryl or aroyl.

Examples of such thio acids are:
Thioacetic acid
Thiopropionic acid
Thiobutyric acid
Thioisobutyric acid
Thio-n-pentenoic acid
Thiocinnamic acid
Thiobenzoic acid
2-Methyl Thiobenzoic acid
3-Methyl Thiobenzoic acid
4-Methyl Thiobenzoic acid
2,4-Dimethyl Thiobenzoic acid
3,5-Dimethyl Thiobenzoic acid Whether an organic base is used or not in the reaction with the 2-ene-1,4 dione with the thio acid having the formula R₃SH, the 2-ene-1,4 dione can be exemplified as follows:

| Compound Name | R₁ | R₂ | R₄ |
|---|---|---|---|
| 3-Hexen-2,5-dione | Methyl | Methyl | Hydrogen |
| 3-Methyl-3-hexen-2,5 dione | Methyl | Methyl | Methyl |
| 3-Methyl-3-hepten-2,5 dione | Methyl | Ethyl | Methyl |
| 3-Ethyl-3-hepten-2,5 dione | Methyl | Ethyl | Ethyl |
| 4-Ethyl-4-octen-3,6 dione | Ethyl | Ethyl | Ethyl |
| 3-Propyl-3-hepten-2,5 dione | Methyl | Ethyl | Propyl |
| 4-Methyl-3-hepten-2,5 dione | Ethyl | Methyl | Methyl |
| 4-Methyl-4-octen-3,6 dione | Ethyl | Ethyl | Methyl |
| 4-Methyl-4-nonen-3,6 dione | Ethyl | Propyl | Methyl |
| 4-Propyl-3-hepten-3,6 dione | Ethyl | Methyl | Propyl |
| 5-Methyl-5-decene-4,7 dione | Propyl | Propyl | Methyl |
| 5-Methyl-4-nonen-3,6 dione | Propyl | Ethyl | Methyl |
| 4-Methyl-3-nonen-2,5 dione | Butyl | Methyl | Methyl |
| 4-Ethyl-3-nonen-2,5 dione | Butyl | Methyl | Ethyl |
| 3-Methyl-3-nonen-2,5 dione | Methyl | Butyl | Methyl |
| 3-Propyl-3-nonen-2,5 dione | Methyl | Butyl | Propyl |
| 3-Butyl-3-hexen-2,5 dione | Methyl | Methyl | Butyl |
| 4-Octen-3,6-dione | Ethyl | Ethyl | Hydrogen |

As stated above, R₁ and R₂ can each be hydrogen for the purposes of these processes of our invention in the event that in the reaction of the 2-ene-1,4 dione with the thio acid of the formula R₃SH, an organic base is used. Hence, in addition to the foregoing compounds, the following compounds can be utilized in the reaction with R₃SH:

| Compound Name | R₁ | R₂ | R₄ |
|---|---|---|---|
| 2-Buten-1,4 dial | Hydrogen | Hydrogen | Hydrogen |
| 2-Methyl-2-Buten-1,4 dial | Hydrogen | Hydrogen | Methyl |
| 2-Pentenal-4-one | Methyl | Hydrogen | Hydrogen |
| 2-Hexenal-4-one | Ethyl | Hydrogen | Hydrogen |
| 3-Methyl-2-Hexenal-4-one | Ethyl | Hydrogen | Methyl |
| 2-Methyl-2-pentenal-4-one | Hydrogen | Methyl | Hydrogen |
| 2-Methyl-2-heptenal-4-one | Hydrogen | Propyl | Methyl |
| 2-Methyl-2-octenal-4-one | Hydrogen | Butyl | Methyl |

Examples of useful organic bases are piperidine, pyridine, quinoline, triethyl amine and α-picoline. In place of such organic bases, radical initiators may be used such as benzoyl peroxide or azobisisobutyl nitrile. The reaction may be is carried out in a solvent such as water or an ether such as diethyl ether or a hydrocarbon such as benzene or hexane or cyclohexane. The reaction may also be carried out without the use of a solvent. The reaction may be is carried out under reflux conditions although temperatures varying from 0° up to 60°C are suitable and will give rise to commercially suitable yields. Examples of reaction products, 2-thia substituted-1,4-diones which are formed from the reation of the 2-ene-1,4 diones with the thio acids having the formula R₃SH are as follows:

| 2-ene-1,4 dione Reactant | R₃SH Thio Acid Reactant | 2-Thia Substituted 1,4-dione Reaction Product |
|---|---|---|
| 3-Hexen-2,5 dione | Thioacetic acid | 3-Thioacetyl-2,5-hexane dione |
| 3-Methyl-3-hexen-2,5 dione | Thiopropionic acid | 3-Thiopropionyl-4-methyl hexane-2,5-dione |
| 3-Methyl-3-heptene-2,5-dione | Thiobenzoic acid | 4-Thiobenzoyl-4-methyl heptane-3,6-dione |
| 4-Ethyl-4-octene-3,6-dione | Thioacetic acid | 4-Thioacetyl-5-ethyl octane-3,6-dione |
| 2-Pentenal-4-one | 4-Methyl-thio-benzoic acid | 3(4-Methyl thiobenzoyl) 2-pentanal-4-one |
| 4-oxo-2-heptenal | Thioacetic acid | 4-oxo-3-thiohexanal |

The foregoing 2-thia substituted 1,4-diones are then cyclized to form substituted or unsubstituted 3-thia furans according to the following reaction:

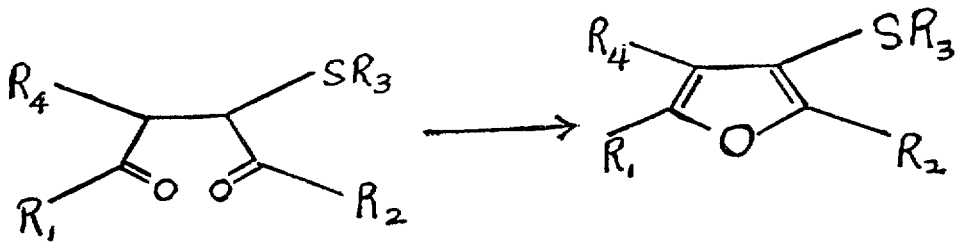

wherein R₁ and R₂ are the same or different and are each hydrogen or lower alky; wherein R₃ is either acyl or aroyl and R₄ is hydrogen or lower alkyl. The resulting 3-thiafurans (novel compounds of our invention) may be used as such for their organoleptic properties or they may be hydrolyzed and then reacylated or rearoylated to form other acyl thia or aroyl thia substituted furans (other novel compounds of our invention) which have still other organoleptic properties useful for flavoring foodstuffs.

The cyclization reaction carried out in cyclizing the 2-thia substituted 1,4-dione is carried out in the presence of a cyclization agent, preferably, isopropenyl acetate. The cyclization is also carried out in the presence of such a catalyst as concentrated sulfuric acid, zinc chloride, boron trifluoride, aluminum trichloride, and para-toluene sulfonic acid, each of these being acid catalysts. Preferably, the ratio of isopropenyl acetate to 2-thia substituted 1,4 dione is 4 to 5:1. The ratio of acid catalyst to isopropenyl acetate is from 0.001 up to 0.05 (mole ratio). The cyclization reaction may be run at temperatures of between 25°C up to reflux at atmospheric pressure (96°C). Still greater reflux temperatures may be used if the presence is greater than atmospheric. Furthermore, in place of isopropenyl acetate as a cyclization reagent, acetic anhydride or propionic anhydride may be used. Ratios of acetic anhydride or propionic anhydride to 2-thia substituted 1,4 dione are preferably 4 to 5:1 (mole ratio).

In the event that the resulting 3-thia furan is desired to be used as a food flavor additive, the reaction product is purified by appropriate extraction and distillation techniques. Thus, the following 3-thia furans of our invention produced in this manner have useful organoleptic properties giving rise to their use as foodstuff flavors as set forth in an illustrative manner in the following table:

| 2-Thia Substituted 1,4-dione Reactant | 3-Thio Furan Reaction Product | Flavor Properties of 3-Thia Furan Reaction Product |
|---|---|---|
| 3-Thio acetyl-2,5-hexane dione | 2,5-dimethyl-3-thio acetyl furan | Roasted meat and gravy-like aroma; roasted meat flavor at 2 ppm (threshhold value 0.05 ppm) Sweet floral horseradish fragrance |
| 3-Thio benzoyl-2,5-hexane dione | 2,5-dimethyl-3-thio benzoyl furan | Cooked chicken-like aroma with roasted meat nuance; fatty floral-like eggy flavor at 2 ppm (threshhold 0.1 ppm). |
| 4-oxo-3-thiohexanal | 2-propyl-3-thio-acetyl furan | A sweet, allium, roasted aroma and taste at 0.25 ppm. |

An optional additional step is hydrolysis of the 3-thia furan to form 3-mercapto furan having the structure:

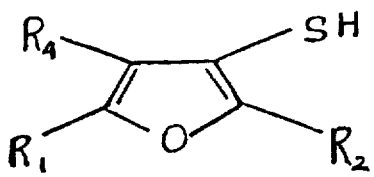

The hydrolysis reaction is carried out in the presence of strong aqueous base, for example, sodium hydroxide, potassium hydroxide, sodium carbonate, lithium carbonate, potassium carbonate, and lithium hydroxide. The mole ratio of base to 3-thia furan is preferably 1:1 but may be as high as 3:1 or as low as 0.01:1. In addition to solely aqueous solutions of base, mixtures of alcohol (e.g., methanol and ethanol) and water may be used as solvents in the hydrolysis reaction. The hydrolysis temperature may vary from room temperature to reflux. In the event that the basic solution is a solution which is alcoholic (substantially purely alcoholic) the alkali metal thiafuran may be formed.

Reacylation of the 3-furan thiol to yield still other acyl thiafurans or aroyl thiafurans is carried out by reaction of the appropriate acyl or aroyl halide with the 3-furan thiol in the presence of an appropriate solvent such as diethyl ether, tetrahydro furan, or cyclohexane and in the presence of preferably a strong organic base such as pyridine or α-picoline. Thus, the following table sets forth the several compounds which can be conveniently formed having a large number of organoleptic properties giving rise to a wide field of flavor uses:

| Name of Compound | organoleptic Property |
|---|---|
| 2-Methyl-3-thio-isobutyryl furan | Sweet, fruity anise-like and liver-like aromas; anise-like sweet fruity roasted meat flavor at 0.05 ppm concentration |
| 2,5-Dimethyl-3-thio-isobutyryl furan | Meaty, ham, green vegetable aroma; ham-like meaty vegetable nutty flavor at 0.1 ppm concentration |
| 2,5-Dimethyl-3-thio-isovaleryl furan | Creamy cocoa-like sweet aroma. Cocoa powder creamy green flavor at 0.1 ppm concentration |
| 2-Methyl-3-thio-isovaleryl furan | Green meaty vegetable-like aroma. Green meaty vegetable-like HVP-like flavor at 0.1 ppm concentration |
| 2-Methyl-3(2-thio-furoyl) furan | HVP-like, meaty aroma; HVP-like, liver-like meaty flavor at 0.02 ppm concentration |
| 2,5-Dimethyl-3(2-thio-furoyl) furan | HVP-like, meaty aroma; HVP-like meaty flavor at 0.1 ppm |
| 2-Methyl-3-thio-octanoyl-furan | Meaty, sour, floral aroma; meaty, sour, floral HVP-like flavor at 0.1 ppm concentration |
| 2,5-Dimethyl-3-thio-octanoyl furan | Meaty brothy aroma; meaty brothy, nutty aroma with HVP after-taste at 0.1 ppm concentration |
| 2,5-Dimethyl-3-thio-benzoyl furan | Cooked chicken-like roasted meat-like aroma; floral-like, fatty flavor at 2 ppm (0.1 ppm threshhold) |
| 2-Methyl-3-thiopivaloyl furan | Roasted meat, sweet aroma; roasted meat vegetable-like flavor at 0.1 ppm concentration |
| 2,5-Dimethyl-3-thiopivaloyl furan | Sweet, meaty chicken-like aroma; Sulfury meaty flavor at 0.5 ppm |
| 2,5-Dimethyl-3-thio-hexanoyl furan | Meaty, green, creamy aroma; Meaty, green, creamy, nutty flavor at 0.5 ppm (0.1 ppm threshhold level) |
| 2,5-dimethyl-3-thio (2-ethylbutynyl) furan | At 0.1 ppm, heavy roasted aroma and sweet, nutty, roasted taste. At 0.2 ppm, sweet, roasted, hazelnut roasted, sweet aroma and taste. At 0.5 ppm, sweet mouthfeel, St. John's bread-like notes and hydrolyzed vegetable protein aroma and taste, with a bloody, meaty, lasting aftertaste. |
| 2-methyl-3-thio(2-ethyl-butyryl) furan | At 0.1 ppm, sweet meat, nutty, earthy meaty, hydrolyzed vegetable protein, meat extract aroma and taste. |
| 2,5-dimethyl-3-thio (2-methylbutyryl) furan | At 0.05 ppm, meaty, roasted, sweet aroma and taste. At 0.1 ppm, sweet, roasted aroma and taste. |
| 2-methyl-3-thio (2-methylbutyryl) furan | At 0.1 ppm, sweet, roasted aroma and taste. |
| 2,5-Dimethyl-3-thio-cinnamoyl furan | Meaty, brown sugar, green walnut aroma; meaty, rubbery, walnut sweet flavor at 2 ppm concentration. |
| 2,5-Dimethyl-3-thio(m-toluoyl) furan | Roasted meat, liver, sulphury aroma; meaty green roasted meat liver, sulphury fresh walnut kernal flavor at 1 ppm. |
| 2,5-Dimethyl-3-thio(2-methyl-2-pentenoyl) furan | Meaty, sweet, HVP, creamy aroma; sweet roasted meat, rubbery flavor at 0.1 ppm. |

Thus, the 3-thiafuran derivatives and mixtures thereof according to the present invention can be used to alter, vary, fortify, modify, enhance, or otherwise improve the organoleptic properties, including flavor and/or aroma, of a wide variety of materials which are ingested, consumed, or otherwise organoleptically sensed. The term "alter" in its various forms will be understood herein to mean the supplying of imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such 3-thiafuran derivatives are accordingly useful in flavoring compositions. Flavoring compositions are herein taken to mean those which contribute a part of the overall flavor impression by supplementing or fortifying a natural or artificial flavor in a material, as well as those which supply substantially all the flavor and/or aroma character to a consumable article.

The term "foodstuffs" as used herein includes both solid and liquid ingestible materials for man or animals, which materials usually do, but need not, have nutritional value. Thus, foodstuffs includes meats, gravies, soups, convenience foods, malt and other alcoholic or non-alcoholic beverages, milk and dairy products, nut butters such as peanut butter and other spreads, seafoods including fish, crustaceans, mollusks and the like, candies, breakfast foods, baked goods, vegetables, cereals, soft drinks, snack foods, dog and cat foods, other veterinary products and the like.

When the 3-thiafuran derivatives according to the invention are used in a food flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners, and flavor intensifiers.

Examples of preferred co-flavoring adjuvants are:
Methyl thiazole alcohol (4-methyl-5-β-hydroxyethyl thiazole);
2-Methyl butanethiol;
4-Mercapto-2-butanone;
3-Mercapto-4-pentanone;
1-Mercapto-2-propanone;
Benzaldehyde;
Furfural;
Furfural alcohol;
2-Mercapto propionic acid;
2-Pentene;
Alkyl pyrazine;
Methyl pyrazine;
2-Ethyl-3-methyl pyrazine;
Tetramethyl pyrazine;
Polysulfides;
Dipropyl disulfide;
Methyl benzyl disulfide;
Alkyl thiophenes;
2-Butyl thiophene;
2,3-Dimethyl thiophene;
5-Methyl furfural;
Acetyl furan;
2,4-Decadienal;
Guiacol;
Phenyl acetaldehyde;
δ- Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Sulfur-containing amino acids;
Cysteine;
Hydrolyzed vegetable protein;
Hydrolyzed fish protein; and
Tetramethyl pyrazine The 3-thiafuran derivatives, or the compositions incorporating them, as mentioned above, can be combined with one or more vehicles or carriers for adding them to the particular product. Vehicles can be edible or otherwise suitable materials such as ethyl alcohol, propylene glycol, water and the like. Carriers include materials such as gum arabic, carrageenan, other gums, and the like. The 3-thiafuran compounds according to this invention can be incorporated with the carriers by conventional means such as spray-drying, drum-drying, and the like. Such carriers can also include materials for coacervating the 3-thiafuran derivatives (and other flavoring ingredients, as present) to provide encapsulated products. When the carrier is an emulsion, the flavoring composition can also contain emulsifiers such as mono- and diglycerides of fatty acids and the like. With these carriers or vehicles, the desired physical form of the composition can be prepared.

The quantity of 3-thiafuran derivatives or mixtures thereof utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuff; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate compositions contain from about 0.02 parts per million (ppm) to about 250 ppm of 3-thiafuran derivative or derivatives. More particularly, in food compositions it is desirable to use from about 0.05 ppm to 100 ppm for enhancing flavors and in certain preferred embodiments of the invention, from about 0.2 to 50 ppm of the derivatives are included to add positive flavors to the finished product. All parts, proportions, percentages, and ratios herein are by weight unless otherwise indicated.

The amount of 3-thiafuran material or materials of our invention to be utilized in flavoring compositions can be varied over a wide range depending upon the particular quality to be added to the foodstuff. Thus, amounts of one or more derivatives according to the present invention of from about 2 ppm up to 80 or 90 percent of the total flavoring composition can be incorporated in such compositions. It is generally found to be desirable to include from about 10 ppm up to about 0.1 percent of the 3-thiafuran derivatives in such compositions.

EXAMPLE 1

(Preparation of Cis-3-hexene-2,5-dione)

In a 1000 ml round bottom flask fitted with condenser and magnetic stirrer are placed 200 g of 2,5-dimethoxy-2,5-dimethyl-2,5-dihydrofuran and 200 ml of a 1% aqueous acetic acid solution. The resulting solution is heated to reflux, refluxed for 2 minutes, cooled with an ice bath to 25°C and 625 ml of a 2% sodium bicarbonate solution is added. The solution is saturated by addition of 23 g of sodium chloride and extracted with methylene chloride (1 × 200 ml and 3 × 100 ml). After drying over sodium sulfate removal of the methylene chloride in vacuo gives 142 g of crude cis-3-hexene-2,5-dione which by GLC analysis is about 90% product having the structure:

EXAMPLE II (Preparation of 3-Thioacetyl-2,5-hexanedione)

In 1000 1000 ml round bottom flask fitted with magnetic stirrer, thermometer, addition funnel and reflux condenser are placed 142 g of crude cis-3-hexene-2,5-dione (ex Example I), 380 ml of ether and 5 drops of piperidine. Thio acetic acid (96.6g) is added over a period of one hour. When about one-eighth of the thio acetic acid is added the solution begins to reflux which continues during the remainder of the addition. After addition is complete the mixture is allowed to stand for 85 minutes. Ether is then removed in vacuo (water asperator) to give 235 g of crude material containing about 91% 3-thioacetyl-2,5-hexanedione. Distillation of a 134 g portion of the crude gives 84.5 g of 3-thioacetyl-2,5-hexanedione boiling at 86° to 87°C at 0.5 corr. NMR, IR and mass spectral analysis confirm the structure:

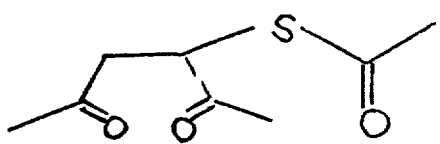

EXAMPLE III (Preparation of 2,5-Dimethyl-3-thioacetyl furan using isopropenyl acetate)

In a 500 ml three necked round bottom flask fitted with reflux condenser, thermometer, mechanical stirrer and addition funnel is placed 225 ml of isopropenyl acetate. The isopropenyl acetate is heated to reflux and 0.5 ml of concentrated sulfuric acid is added. A solution of 25 g of 3-thioacetyl furan (produced according to Example II) in 25 ml of isopropenyl acetate is added over a 20 minute period while maintaining reflux. The mixture is heated at reflux for an additional 20 minutes and then cooled to room temperature during which time 10 g of sodium bicarbonate is added. After removal of isopropenyl acetate in vacuo (35°at 20 mm), 50 ml of benzene is then added and the mixture is placed in a separatory funnel. 10 ml of water is then added to the mixture, and when carbon dioxide evolution stops, the aqueous layer is separated. Concentration in vacuo (35° bath, 20 mm) of the organic phase gives 22.2 g of a dark brown oil. Distillation of the oil gives 116.5 g of 2,5-dimethyl-3-thioacetyl furan boiling at 47°–48°C at 0.25 mm.

EXAMPLE IV (Preparation of 2,5-Dimethyl-3-furanthiol)

In a 1000 ml, three-necked flask fitted with thermometer, reflux condenser, nitrogen inlet and mechanical stirrer is placed 35 g of 2,5-dimethyl-3-thioacetyl furan (Produced by the process of Example III) and 350 ml of 15 sodium hydroxide solution. The two phase mixture is heated to reflux and after 35 minutes becomes homogeneous. The mixture is heated another 20 minutes and cooled to room temperature. The pH of the solution is adjusted to 1 by the addition of 310 ml of 20% sulfuric acid and the resulting mixture extracted with ether (3 × 100 ml). Washing of the combined ether solutions with saturated sodium chloride solution (4 × 75 ml), drying with anhydrous sodium sulfate and solvent removal in vacuo (25°C at 55 mm) gives 26.2 g of crude material. Distillation of the crude material gives 17.3 g of 2.5-dimethyl-3-furanthiol boiling at 79°C at 43 mm. MS, NMR and IR analysis confirm the material as 2,5-dimethyl-3-furanthiol.

EXAMPLE V (Preparation of 3-Mercapto-2,5-hexanedione)

To 150 ml of a 2% sodium hydroxide solution in a flask fitted for stirring is added 10 g of 3-thioacetyl-2,5-hexanedione. After stirring for one hour the pH of the mixture is adjusted to 5–6 by the addition of dilute (10%) hydrochloric acid, the solution is saturated with sodium chloride solution and extracted with ether (4 × 25 ml). The ether extracts are combined, washed with saturated sodium chloride solution (15 ml), dried and concentrated in vacuo to give 6.2 g of crude 3-mercapto-2,5-hexanedione. Vacuum distillation gives 2.5 g of 3-mercapto-2,5-hexanedione boiling at 57°–59°C at 0.85 torr. NMR, IR and mass spectral analysis confirm the structure as 3-mercapto-2,5-hexanedione.

EXAMPLE VI (Preparation of 2-Methyl-3-furanthiol)

A. 4-Oxo-2-pentanal

Into a 5 liter, three-necked flask fitted with mechanical stirrer, thermometer and vacuum take-off are placed 600 g of 2-methyl-2,5-dimethoxy-2,5-dihydrofuran and 2400 ml of deionized water. After 20 minutes of stirring at room temperature, the mixture becomes homogeneous and has a pale yellow green color. Analysis of a sample of the reaction mixture by GLC after 3.25 hours shows 22% methanol, 67% 4-oxo-2-pentanal and 9% starting material. Vacuum 26 torr.) is applied to the reaction mixture while maintaining the temperature of the reaction mixture between 25° and 30°C. After 3.25 hours GLC analysis shows 13% methanol, 82% 4-oxo-2-pentanal and 3.2% starting material. The vacuum is removed and the reaction mixture is allowed to stand at room temperature overnight. Analysis after standing overnight shows 12.9% methanol, 85% 4-oxo-2-pentanal and 2.1% starting material.

B. 3-Thioacetyl-4-oxo-pentanal

In a 5 liter, three-necked flask fitted with mechanical stirrer, thermometer and addition funnel are placed 2325 ml of the solution obtained in (A) and 2 ml of piperidine diluted in 5 ml of water. To this solution is added a mixture of thiolacetic acid (292.3 g) and piperidine (13 ml) over a 20 minute period. After standing an additional 10 minutes, 20 ml of concentrated hydrochloric acid is added, the resulting mixture poured into a separatory funnel and the oil layer removed. The aqueous layer is extracted with benzene (500 ml) and methylene chloride (2 × 500 ml). The benzene extract is combined with the oil layer and the mixture is dried over sodium sulfate. The methylene chloride extracts are combined and dried over sodium sulfate. Solvent removal in vacuo (40°–45° bath at 15 torr.) gives 414.5 g of crude oil from the benzene extract and 172.5 g of crude oil from the methylene chloride extracts. The crude 3-thioacetyl-4-oxo-pentanal is used "as-is" in 1 next step.

C. 2-Methyl-3-thioacetyl furan

In a 12 liter, three-necked flask fitted with stirrer, reflux condenser, thermometer and addition funnel are placed 2950 ml of isopropenyl acetate and 2 ml of concentrated sulfuric acid. The mixture is heated to reflux and a solution of crude 3-thioacetyl-4-oxo-pentanal (587 g)(obtained in Part (B) supra) in 1,170 ml of isopropenyl acetate is added over a 35 minute period. After refluxing an additional 40 minutes sodium bicarbonate (35 g) is added and removal of excess isopropenyl acetate in vacuo is commenced. The pressure is gradually decreased from 200 to 30 torr. as the temperature of the reaction mixture drops from 90° to 30°C at which temperature it is maintained until the volume of the reaction mixture is about 1500 ml. The material is further concentrated in vacuo (bath temperature 50 °C and 5 torr.) to form a dark brown oil. The concentrate is diluted with 750 ml of benzene and washed with 250 ml of water. After drying over sodium sulfate solvent removal in vacuo (40°–50°C bath temperature and 10 mm) gives 647 g of a dark brown oil. Distillation of this oil gives 26.8 g of material boiling at 67°–70°C at 1.1 mm which is 62% 2-methyl-3-thioacetylfuran. Redistillation gives 150 g of 2-methyl-3-thioacetylfuran of 86% purity determined by GLC boiling at 71°–76°C at 5.8 to 6.2 mm Hg. pressure.

D. Hydrolysis of 2-Methyl-3-thioacetylforan to 2-methyl-3-furanthiol

A 5% solution (1500 ml) of sodium hydroxide in water is heated to reflux under nitrogen. When reflux commences 151 g of 2-methyl-3-thioacetylfuran is added over a 15 minute period. After 5 minutes heating is stopped and the mixture allowed to cool. When the temperature reaches 30 °C, 258.1g of sodium dihydrogen phosphate monohydrate and 10 ml of acetic acid are added. After the salt is dissolved the mixture is extracted with methylene chloride (3 × 250 ml). After drying the methylene chloride extracts by filtration through sodium sulfate and washing the sodium sulfate with 100 ml of methylene chloride, the combined methylene chloride solutions are concentrated in vacuo (30° at 25 mm) to yield 94.8 g of crude 2-methyl-3-furanthiol Distillation gives 64.6 g of 2-methyl-3-furanthiol boiling at 55°–56° at 41–42 mm.

EXAMPLE VII (Preparation of 2-Thioacetylfuran)

A. Preparation of 2-Butene-1,4-dial

A mixture of 2,5-dimethoxy-2,5-dihydrofuran (20 g), water (80 ml) and acetic acid (3 drops) is stirred for 105 minutes at room temperature, 22 minutes at 40°C and 90 minutes between 60° and 75°C. GLC analysis at this point indicates 15.7% starting material and 83.5% 2-butene-1,4-dial The mixture is cooled to 25°C and sodium bicarbonate (0.3 g) is added.

B. Preparation of 3-Thioacetyl-1,4-butanedial

To the aqueous solution obtained in SSA, supra, is added 10 g of thiolacetic acid during a 14 minute period. During the addition, the temperature is kept below 30°C by intermittent application of a cooling bath. After 110 minutes, the reaction mixture is extracted with methylene chloride (3× × 35 ml). The combined methylene chloride extracts are dried and then concentrated in vacuo to give 17.3 g of yellow oil containing about 80% 2-thioacetyl-1,4-butanedial. The compound is identified through mass spectral, NMR and IR analysis as having the structure:

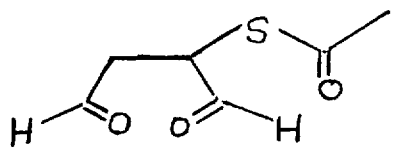

M.S. — No molecular ion; remaining peaks in decreasing intensity — 43, 29, 27, 45, 55, 60, 84, 100 and 142 m/e units.

NMR (CDCl$_3$):δ, 2.38, (s,3); 3.02, (multiplet 2J=10H$_z$); 4.46, (t.1,J=10H$_z$); 9.40, (s,1); and 9.68, (s,1) ppm.

IR (thin film) — 2850, 2750, 1720, 1700 (shoulder). 1388, 1352, 1132 and 958 cm$^{-1}$ C. Preparation of 3-thioacetylfuran In a 500 ml flask fitted with mechanical stirrer, reflux condenser, addition funnel and thermometer are placed 109 ml of isopropenyl acetate and 0.2 ml of concentrated hydrochloric acid. The resulting mixture is heated to reflux and, when reflux commences, a solution of crude 2-thioacetyl-1,4-butanedial (produced in SSB, supra) in 70 ml of isopropenyl acetate is added over a 31 minute period while maintaining reflux. The mixture is heated at reflux for 15 minutes after addition is complete. After cooling to 25°C, sodium bicarbonate (2.4 g) is added and the mixture stirred for 20 minutes. The mixture is concentrated in vacuo and 60 ml of benzene and 25 ml of water are added. The benzene layer is separated, washed with saturated sodium bicarbonate solution (5 × 25 ml), dried with sodium sulfate and concentrated in vacuo to give 14.7 g of an oil. Vacuum distillation gives 1.24 g of 97.5% pure 3-thioacetylfuran. Mass spectral, NMR and IR analysis confirm the structure as 3-thioacetylfuran.

Mass spectrum, molecular ion, then peaks in decreasing intensity; 142, 43, 100, 45, 69, 71, 72 and 73 m/e units.

NMR (CDCl$_3$) δ2.34 (s,3), 6.38 (d,1,J=1H$_z$) and 7.46 (m,2,J=1H$_z$) ppm.

IR (thin film) 3120, 1710, 1495, 1355, 1197, 1147), 1110, 1072, 1010, 953, 940, 870 and 795 cm⁻¹.

EXAMPLE VIII

The following formulation is prepared:

| Ingredient | Parts by Weight |
| --- | --- |
| Liquid hydrolyzed vegetable protein | 90 |
| 4-Methyl-beta-hydroxy-ethyl-thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2,5-Dimethyl-3-thiobenzoyl furan | 2.00 |

The 2,5-dimethyl-3-thiobenzoyl furan has a sweet blending effect, imparting a meat taste of a nondescript character leaning towards chicken meat. This chemical helps reduce the typical hydrolyzed vegetable protein taste and ties in and rounds up the other meat-like chemicals in the formula.

EXAMPLE IX

The following formulation is prepared:

| Ingredient | Parts by Weight |
| --- | --- |
| Liquid hydrolyzed vegetable protein | 90 |
| 4-Methyl-beta-hydroxy-ethyl-thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2,5-Dimethyl-3-thiohexanoyl furan | 2.00 |

The 2,5-dimethyl-3-thiohexanoyl furan adds specific meat notes to the formulation. It is sweet and creamy and very specifically reminiscent of white meat chicken. In general, it upgrades the formula by imparting a distinct meat character.

EXAMPLE X

Preparation of 2,5-Dimethyl-3-thio-2-ethylbutyryl)-furan 29 g of 2,5-dimethyl-3-furan thiol (0.226 moles is dissolved in 200 cc of diethyl ether and charged to a 500 ml reaction vessel with 17.8 g of pyridine 0.226 moles). Alpha-ethyl-n-butyryl chloride (30.5 g) (0.226 moles) is dissolved in 100 ml of ether and the alpha-ethyl-n-butyryl chloride solution is charged slowly to the reaction vessel over a period of 15 minutes. The reaction mass is then stirred for three hours and allowed to remain at room temperature for a period of 72 hours.

The reaction mass is then poured into 500 ml of water thereby creating two phases; an upper ether layer and a lower aqueous phase. The ether layer is washed with 500 ml of 4% hydrochloric acid followed by 500 ml of saturated sodium bicarbonate solution. The ether layer is then dried over anhydrous sodium sulfate and concentrated to yield an orange oil, crude 2,5-dimethyl-3-thio-(2-ethyl-butyryl)-furan.

The crude material is then distilled at a vapor temperature of 87°–88°C and a pressure of 0.55 mm Hg, yielding 16.6 g of product, confirmed by IR, NMR and mass spectral analysis to have the structure:

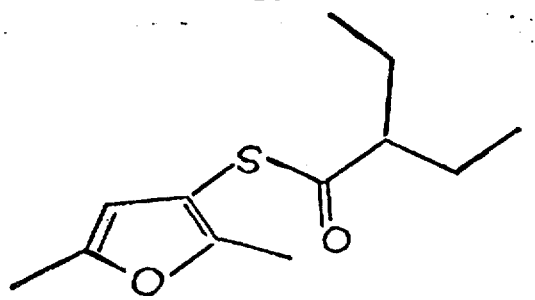

Mass Spectral Analysis: Molecular Ion, then in descending intensity: 226, 43, 71, 128, 99, 41, 39, 127 m/e.

NMR Spectrum (CDCl₃): 5.91, (s, 1): 3.62, (m, 1); 2.25, (s,3); 2.22, (s,3); 1.64, (m,4); 0.95, (t,6) ppm.

EXAMPLE XI

Preparation of 2-Methyl-3-thio-(2-ethylbutyryl)-furan

Into a 500 ml reaction flask equipped with stirrer, thermometer and reflux condenser, a solution of 29 g of 2-methyl-3furanthiol (0.255 moles) dissolved in 195 ml of diethyl ether is added. 20.2 g of pyridine (0.255 moles) is then added to the reaction vessel. 34.5 g of alpha-ethyl-n-butyryl chloride (0.255 moles) is then dissolved in 100 ml of diethyl ether and this solution is slowly added to the reaction vessel over a period of 15 minutes. When the addition is complete, the reaction mass is stirred for a period of 3 hours and then allowed to remain over a period of 72 hours at room temperature.

The reaction mixture is then poured into 500 ml of water yielding two phases; an upper ether layer and a lower aqueous phase. The ether layer is washed with 500 ml of 4% aqueous hydrochloric acid and then 500 ml of saturated sodium bicarbonate solution. The ether layer is then dried over anhydrous sodium sulfate and is concentrated to yield 43.8 g of a yellow orange oil.

This oil is distilled at a temperature of 73.5°–75°C and a pressure of 0.45–0.55 mm Hg to yield 39.0 g of 2-methyl-3-thio-(2-ethylbutyryl) furan having the structure:

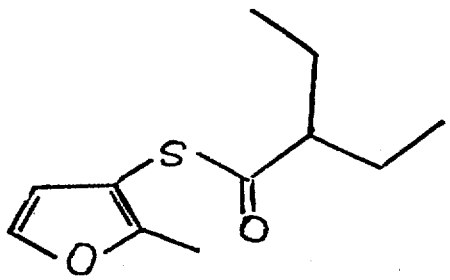

Mass Spectral Analysis: Molecular Ion, then in descending intensity: 212, 43, 41, 39, 71, 99, 114, 113 m/e.

NMR Spectrum (CDCl₃): 7.36, (d,1, J=1.8 Hz); 6.30, (d,1,J=1.8 Hz); 2,48, (m,1); 2.24, (s,3); 1.64, (m,4); 0.96, (t,6) ppm.

EXAMPLE XII

Preparation of
2,5-Dimethyl-3-thio(2-methylbutyryl)-furan

Into a 500 ml reaction vessel equipped with stirrer, thermometer, reflux condenser and addition funnel, 29 g of 2,5-dimethyl-3-furanthiol (0.226 moles) dissolved in 200 ml of diethyl ether is added. 27.4 g of 2-methylbutyryl chloride (0.226 moles) dissolved in 100 ml of diethyl ether is then charged to the addition funnel. Over a period of 25 minutes, the 2-methyl-butyryl chloride solution in diethyl ether is added to the reaction mass from the addition funnel with stirring. When addition is complete, the reaction mass is then stirred for a period of 2 hours. At the end of this 2-hour period, 17.8 g of pyridine (0.226 moles) is added to the reaction mass and the reaction mass is stirred for a period of 2 hours.

The reaction mass is then poured into 500 ml of water yielding two phases; an upper clear orange ether layer and a lower aqueous phase in which pyridine hydrochloride is dissolved.

The ether layer is then washed with 500 ml of 4% hydrochloric acid and then 500 ml of a saturated sodium bicarbonate solution. The ether layer is then dried over anhydrous sodium sulfate and concentrated, yielding 40.8 g of an orange oil which is crude 2,5-dimethyl-3-thio-2-methylbutyryl)-furan. This crude material is then distilled at a temperature of 68°–70.5°C and a pressure of 0.30 mm Hg., yielding 33.8 g of product, 2,5-dimethyl-3-thio-(2-methylbutyl furan, having the structure:

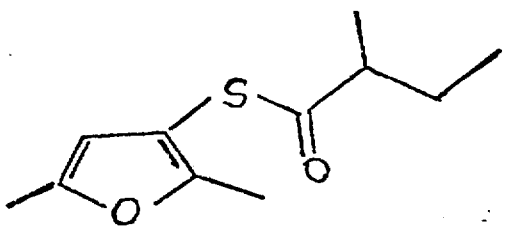

Mass Spectral Analysis: Molecular Ion, then in descending intensity: 212, 128, 57, 43, 85, 41, 39 m/e NMR Spectrum (CDCl$_3$): 5.92, (s,1); 2.66, (q,1, J=6Hz); 2.28, (s3); 2.23, (s,3); 1.61, (m,2); 1.12, (d,3,J=6Hz); 0.95, (t,3,J=6Hz ppm.

EXAMPLE XIII

Preparation of
2-Methyl-3-thio-(2-methylbutyryl)-furan

Into a 500 ml flask equipped with stirrer, thermometer, reflux condenser and addition funnel, 29 g of 2-methyl-3furanthiol 0.255 moles) dissolved in 200 ml of diethyl ether is added. 30.5 g of 2-methylbutyryl chloride (0.255 moles) dissolved in 100 ml of diethyl ether is then added to the addition funnel. The 2-methylbutyryl chloride solution is then added to the reaction mass, dropwise, over a period of 15 minutes from the addition funnel. 20.2 g of pyridine (0.255 moles) is then added to the reaction mass and the stirring is continued for another 10 minutes. When addition is complete, the reaction mass is stirred for a period of 80 minutes, after which it is allowed to remain, for a period of 72 hours, at room temperature.

The reaction mass is then poured into 500 ml of water yielding two phases; an aqueous phase having pyridine hydrochloride dissolved therein, and an ether layer. The ether layer is washed with 500 ml of 4% hydrochloric acid and 500 ml of saturated sodium bicarbonate solution. The ether layer is then dried over anhydrous sodium sulfate and concentrated to 39.1 g of a yellow oil, which is crude 2-methyl-3-thio-(2-methylbutyryl)-furan. This crude material is then distilled at a temperature of 65°–66°C and a pressure of 0.55 mm Hg, yielding 32.7 g of 2-methyl-3-thio-(2-methylbutyryl)-furan having the structure:

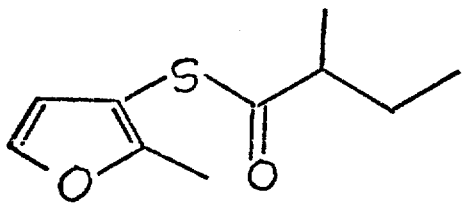

Mass Spectral Analysis: Moledular Ion, then in descending intensity: 198, 57, 85, 41, 43, 114, 39 m/e.

NMR Spectrum (CDCl$_3$): 7.38, (d,1,J=1.8 Hz); 5.32, (d,1,J=1.8 Hz); 2.68, (m,1): 2.26, (s,3); 1.67, (m,2); 1.21, (d,3); 0.96, (t,3ppm.

EXAMPLE XIV

Preparation of 2,5-Dimethyl-3-thioisovaleryl furan

Into a 25 ml flask equipped with magnetic stirrer, thermometer and addition funnel, are added:

| i. | 2,5-dimethyl-3-furanthiol | 1.0 g (0.0078 moles) |
|---|---|---|
| ii. | Diethyl ether | 10 ml |

After stirring for 5 minutes, 0.62 g pyridine (0.0078 moles) is added to the reaction mass. After the pyridine addition, 0.94 g of isovaleryl chloride (0.0078 moles) is added, dropwise, from the addition funnel, over a 2-minute period, to the reaction mass. A white precipitate forms which is pyridine hydrochloride. The temperature in the flask rises to 35°C. After stirring for a 30-minute period, the reaction mass is filtered via suction filtration, and the filtrate is concentrated in vacuo, to a yellow-orange liquid (containing a small amount of solid) weighing 1.56 g. The major peak is trapped out by GLC and analyzed via mass spectral, NMR and IR analysis. It is confirmed to be 2,5-dimethyl-3-thioisovaleryl furan having the structure:

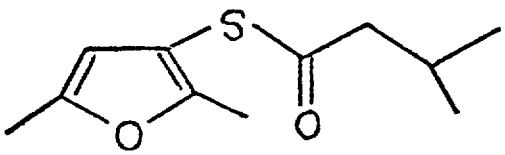

Mass Spectral Analysis: Molecular Ion, then in decreasing intensity: 212, 57, 128, 93, 85, 212, 127 m/e.

NMR Analysis (CDCl₃):

| Signal | Interpretation |
|---|---|
| 0.97 d, 6) | —CH(CH₃)(CH₃) |
| 2.17 (s,3) 2.22 (s,3) | H₃C-furan-CH₃ |
| 2.45 (m,2) | >CH₂ |
| 5.84 (s,1) ppm | —H |

EXAMPLE XV

Preparation of 2,5-Dimethyl-3-thioisobutyryl furan

Into a 25 ml flask equipped with magnetic stirrer, thermometer and addition funnel, are added:

| i. | 2,5-dimethyl-3-furanthiol | 1.0 g (0.0078 moles) |
|---|---|---|
| ii. | Diethyl ether (anhydrous) | 10 ml |

After stirring for 5 minutes, 0.62 g pyridine (0.0078 moles) is added to the reaction mass. After the pyridine addition, 0.83 g isobutyryl chloride (0.0078 moles) is added, dropwise, from the addition funnel, over a one-minute period, to the reaction mass. A white precipitate forms which is pyridine hydrochloride. The temperature in the flask rises to 35°C. After stirring for a 30-minute period, the reaction mass is filtered by suction filtration, and the filtrate is concentrated in vacuo to an orange liquid weighing 1.32 g. The material is analyzed by GLC analysis and the major peak is trapped and is confirmed by GLC, NMR, IR and mass spectral analysis to be 2,5-dimethyl-3-thioisobutyryl furan, having the structure:

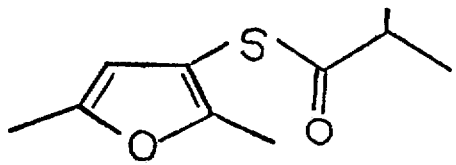

Mass Spectral Analysis: Molecular Ion, then in decreasing intensity: 199, 93, 128, 71, 198, 127 m/e.

NMR Analysis (CDCl₃):

| Signal | Interpretation |
|---|---|
| 1.20 (d, 6) | —CH(CH₃)(CH₃) |
| 2.16 (s, 3) 2.22 (s, 3) | H₃C-furan-CH₃ |
| 2.80 (m, 1) | —CH |
| 5.85 (s, 1) ppm | —H |

EXAMPLE XVI

Preparation of 2-Methyl-3-thioisovaleryl furan

Into a 25 ml flask equipped with magnetic stirrer, thermometer and addition funnel, are added:

| i. | 2-methyl-3-furanthiol | 1.0 g (0.0088 moles) |
|---|---|---|
| ii. | Diethyl ether (anhydrous) | 10 ml |

After stirring the mass for 5 minutes, 0.70 g pyridine is added thereto (0.0088 moles). After the pyridine addition, 1.06 g isovaleryl chloride (0.0088 moles) is added, dropwise, from the addition funnel, over a 3-minute period, to the reaction mass. A white precipitate forms which is pyridine hydrochloride. The temperature of the reaction mass rises to 38°C. After stirring for a 30-minute period, the reaction mass is filtered via suction filtration and concentrated in vacuo to give a yellow-green liquid containing a small amount of solid and weighing 1.0 g. A sample is analyzed using GLC analysis and found to contain 93% product. The major peak is trapped using GLC and as confirmed by mass spectral, IR and NMR analysis is 2-methyl-3-thioisovaleryl furan, having the structure:

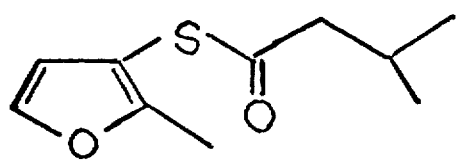

Mass Spectral Analysis: Molecular Ion, then decreasing intensity: 198, 57, 95, 41, 114, 198, 93, 113 m/e.

NMR Analysis (CDCl₃):

| Signal | Interpretation |
|---|---|
| 0.97 (d, 6) | —CH(CH₃)(CH₃) |
| 2.19 (m, 1) | —CH |
| 2.21 (s, 3) | —CH₃ |
| 2.46 (d, 2) | —CH₂ |
| 6.28 (d, 1) | —H |
| 7.31 (d, 1) ppm | —H |

EXAMPLE XVII

Preparation of 2-Methyl-3-(2-thiofuroyl)-furan

Into a 25 ml flask equipped with magnetic stirrer, thermometer and addition funnel, are added:

| i. | 2-Furoyl chloride | 1.14 g (0.0088 moles) |
|---|---|---|
| ii. | Diethyl ether (anhydrous) | 10 ml |

After stirring for 2 minutes, 0.70 g dry pyridine (0.0088 moles) are added to the mass. After the pyridine addition, 1.0 g of 2-methyl-3-furan thiol is added, dropwise, from the addition funnel, over a period of two minutes, to the reaction mass. The temperature rises to 38°C and a white precipitate forms (pyridine hydrochloride). The reaction mass is then stirred for a period of 30 minutes, after which period of time, it is filtered via suction filtration. The filtrate is concentrated in vacuo to a yellow liquid weighing 1.65 g. This material, as confirmed by GLC, mass spectral, IR and NMR analysis is 2-methyl-3thiofuroyl furan having the structure:

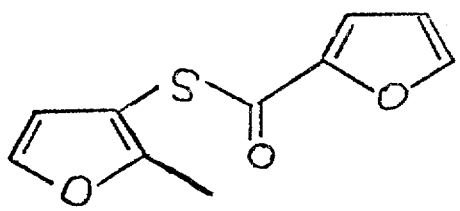

Mass Spectral Analysis: Molecular Ion, then descending intensity: 208, 95, 39, 43, 113 m/e.

NMR Spectrum (CDCl₃): 7.57, (d,1); 7.36 (d,1); 7.30, (d,1); 6.51, (q,1); 6.33, (d,1); 2.26, (s,3) ppm.

EXAMPLE XVIII

Preparation of 2,5-Dimethyl-3-2-Thiofuroyl)-furan

Into a 25 ml flask equipped with magnetic stirrer, thermometer and addition funnel, are added:

| i. | 2,5-Dimethyl-3-furanthiol | 1.0 g (0.0078 moles) |
|---|---|---|
| ii. | Diethyl ether (anhydrous) | 10 ml |

After stirring for 2 minutes, 0.62 g pyridine (0.0078 moles) is added to the reaction mass. After the pyridine addition, 1.01 g 2-furoyl chloride (0.078 moles) is added, dropwise, from the addition funnel, over a 2 minute period, to the reaction mass. The temperature of the reaction mass rises to 36°C and a white precipitate forms (pyridine hydrochloride). The reaction mass is then filtered via suction filtration, and the filtrate is concentrated in vacuo to an amber liquid containing a small amount of solid, and weighing 1.25 g and containing 87.9% 2,5-dimethyl-3-(2-thiofuroyl)-furan (ascertained by GLC analysis). Mass spectral, NMR and IR analysis confirm the structure as being:

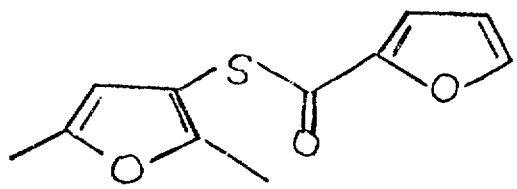

Mass Spectral Analysis: Molecular Ion, then in decreasing intensity: 222, 95, 43, 222, 41, 194, 57 m/e.

NMR Analysis (CDCl₃):

| Signal | Interpretation |
|---|---|
| 2.23 (s,3) | |
| 2.25 (s,3) | |
| 5.92 (s,1) | —H |
| 6.53 (m,1) | —H |
| 7.19 (s,1) | —H |
| 7.57 (s,1) ppm | —H |

EXAMPLE XIX

Preparation of 2-Methyl-3-thiooctanoyl Furan

Into a 25 ml flask, equipped with magnetic stirrer, thermometer and addition funnel, are added:

| i. | 2-Methyl-3-furan thiol | 1.0 g (0.0088 moles) |
|---|---|---|
| ii. | Diethyl ether (anhydrous) | 10 ml |

After stirring the mass for 5 minutes, 0.70 g pyridine (0.0088 moles) is added thereto. After the pyridine addition, 1.43 g octanoyl chloride (0.0088 moles) is added, dropwise, over a 2 minute period, from the addition funnel, to the reaction mass. A white precipitate forms (pyridine hydrochloride) and the temperature of the reaction mass rises to 38°C. After addition of the octanoyl chloride is complete, the reaction mass is stirred for a period of 30 minutes, after which period it is filtered via suction filtration. The resulting filtrate is then concentrated in vacuo giving an amber liquid containing a small amount of solid and weighing 1.30 g. The major component is trapped using GLC and is determined by IR, mass spectral and NMR analysis to be 2-methyl-3-thiooctanoyl furan, having the structure:

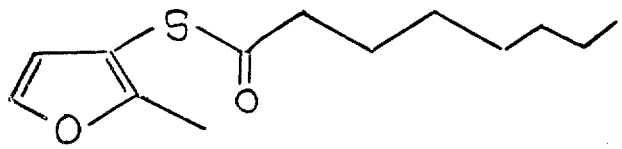

Mass Spectral Analysis: Molecular Ion, then in decreasing intensity: 240, 57, 177, 43, 114, 41, 240 m/e.

NMR Analysis (CDCl₃):

| Signal | Interpretation |
|---|---|
| 0.85 (m, 3) | —CH₃ |
| 1.38 (m, 8) | —[CH₂]₄— |
| 1.68 (m, 2) | —CH₂— |
| 2.2 (s, 3) | —CH₃ |
| 2.57 (d, 2) | —CH₂— |
| 6.25 (d, 1) | —H |
| 7.30 (d, 1) ppm | —H |

EXAMPLE XX

Preparation of 2,5-Dimethyl-3-Thiooctanoyl Furan

Into a 25 ml flask equipped with magnetic stirrer, thermometer and addition funnel, are added:

| i. | 2,5-Dimethyl-3-furanthiol | 1.0 g (0.0078 moles) |
|---|---|---|
| ii. | Diethyl ether (anhydrous) | 10 ml |

After stirring for three minutes, at room temperature, 0.62 g dry pyridine (0.0078 moles) is added to the reaction mass. After the pyridine addition, 1.26 g n-octanoyl chloride is added, dropwise, over a period of two minutes, from the addition funnel to the reaction mass. A white precipitate forms (pyridine hydrochloride) and the temperature of the reaction mass rises to 35°C. After the addition of the n-octanoyl chloride, the reaction mass is stirred for a period of thirty minutes, after which the mass is filtered via suction filtration.

The resulting filtrate is concentrated in vacuo giving an amber liquid weighing 1.63 g. The major product is trapped using GLC and is confirmed to be 2,5-dimethyl-3-thiooctanoyl furan by mass spectral, NMR and IR analysis, having the structure:

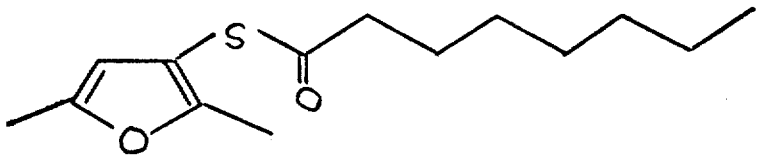

Mass Spectral Analysis Molecular Ion, then in decreasing intensity 254, 128, 57, 43, 254, 127, 41 m/e.

NMR Analysis (CDCl$_3$):

| Signal | Interpretation |
| --- | --- |
| 0.86 (m,3) | —CH$_2$CH$_3$ |
| 1.28 (m,8) | —[CH$_2$]$_4$—CH$_3$ |
| 1.64 (m,2) | $\underset{\text{O}}{\overset{\shortparallel}{\text{—C—CH}_2\text{CH}_2\text{—CH}_2\text{—}}}$ |
| 2.25 (s,3) | |
| 2.20 (s,3) | |
| 2.56 (t,2) | H$_3$C —CH$_2$— CH$_3$ |
| 2.84 (s,1) ppm | H |

EXAMPLE XXI

Preparation of 2,5-Dimethyl-3-thiobenzoyl Furan

Into a 50 ml round bottom, three-neck flask equipped with magnetic stirrer, 10 ml addition funnel, nitrogen inlet, y-tube and thermometer, 30 ml diethyl ether, 1.86 g of anhydrous pyridine (0.0235 moles) and 3 g of 2,5-dimethyl-3-furan thiol (0.0235 moles) are charged. Over a period of 25 minutes, 3.30 g of benzoyl chloride (0.0235 moles) is added to the reaction mass with stirring. After the addition of the benzoyl chloride is complete, 6 ml of diethyl ether is added to the reaction mass, which is then stirred for a period of 40 minutes at room temperature. At the end of this period of time, the resultant slurry (orange solution and heavy white solid) is filtered through sodium sulfate. The filter cake is washed with diethyl ether. The combined filtrates are concentrated on a rotary evaporator, yielding a crude yellow oil, which is crude 2,5-dimethyl-3-thiobenzoyl furan. The filter cake is then washed with n-pentane (30 ml) yielding a yellow solution which is then evaporated, yielding a heavy yellow oil. The oils are combined to yield 4.25 g of crude material which is then distilled at a temperature of 118°–122°C at 0.5 mm Hg.pressure, yielding 2,5-dimethyl-3-thiobenzoyl furan, the structure of which is confirmed by mass spectral analysis, NMR analysis and IR analysis to be:

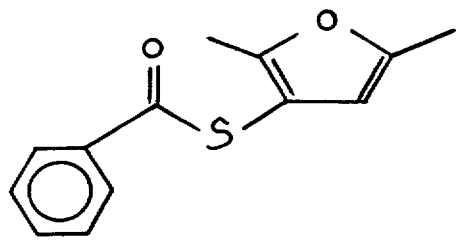

Mass Spectral Analysis: Molecular Ion, then decreasing intensity: 232, 105, 77, 43, 51.

NMR Spectrum (CDCl$_3$): 7.95, (m,2); 7.42, (m,3); 5.92, (s,1); 2.26, (s,3); 2.22, (s,3) ppm.

EXAMPLE XXII

Preparation of 2,5-Dimethyl-3-thiocinnamoyl Furan

In a 250 ml flask is placed 5 g of 2,5-dimethyl-3-furanthiol, 40 ml diethyl ether, 3.08 g pyridine and 6,48 g cinnamoyl chloride. The resulting mixture is permitted to stand for 12 hours. The mixture is then washed with 17 ml H$_2$O, 17 ml 4% HCl and 17 ml of saturated NaH CO$_3$ solution. The ether layer is then dried over anhydrous Na$_2$SO$_4$ and the solvent is removed in vacuo to give crude 2,5-dimethyl-3-thiocinnamoyl furan as a yellow crystalline solid. Recrystallization from hexane gives a sample of 2,5-dimethyl-3-thiocinnamoyl furan melting a 64°–66°C, having the structure:

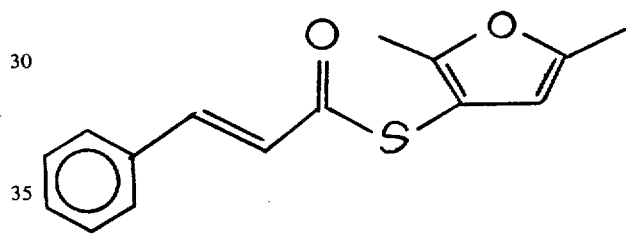

Mass Spectral Analysis: Molecular Ion, then in descending intensity: 258, 131, 103, 43, 77 m/e.

NMR Spectrum (CDCl$_3$): 7.80, (d, 1, J=8 Hz); 7.40, (m, 5); 6.70, (d, 1, J=8 Hz); 5.90, (s,1); 2.12 (s,3); 2.10, (s,3).

EXAMPLE XXIII

Preparation of 2,5-Dimethyl-3-thio-(m-toluoyl) Furan

In a 250 ml flask is placed 5 g of 2,5-dimethyl-3-furanthiol, 40 ml diethyl ether, 3.08 g pyridine and 6.03 g m-toluoyl chloride. The resulting mixture is permitted to stand for 12 hours. The mixture is then washed with 17 ml H$_2$O, 17 ml 4% HCl and 17 ml of saturated NaH-CO$_3$ solution. The ether layer is then dried over anhydrous Na$_2$SO$_4$ and the solvent is removed in vacuo to give crude 2,5-dimethyl-3-thio-(m-toluoyl) furan. Distillation of this residue gives 3.3 g boiling at 123.5°C at 0.27 mm Hg. pressure, having the structure:

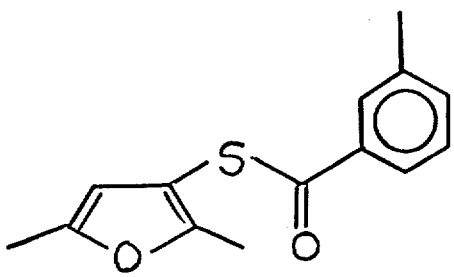

Mass Spectral Analysis: Molecular Ion, then in descending intensity: 246, 119, 43, 91, 127 m/e.

NMR Spectrum (CDCl₃): 7.76, (m, 2); 7.30, (m 2); 5.90, (s, 1); 2.43, (s, 3); 2.22, (s, 3); 2.20, (s, 3) ppm.

EXAMPLE XXIV

Preparation of 2,5-Dimethyl-3-furanthiol/sodium Hydroxide Semisolid Mass

In a 50 ml three-necked flask equipped with reflux condenser, magnetic stirrer and thermometer is placed 20 ml methanol and 0.5 g NaOH. The mixture is stirred until homogeneous and then 5.1 g of 2,5-dimethyl-3-thioacetyl furan is added. The mixture is allowed to stand for two hours and then brought to reflux for 2 hours. The resulting orange colored solution is concentrated in vacuo to remove the methanol, resulting in an orange semisolid.

EXAMPLE XXV

Preparation of 2,5-Dimethyl-3-thio-(2-methyl Pentenoyl Furan

Into a 100 ml three-neck reaction flask equipped with reflux condenser, calcium chloride drying tube, magnetic stirrer and thermometer is placed 4.5 g of the 2,5-dimethyl-3-furanthiol/sodium hydroxide semi-solid mass prepared according to the process of Example XXIV. This material is slurried in 25 ml of tetrahydrofuran, resulting in an almost complete solution. The resulting solution is then stirred rapidly. To this solution is added 4.0 g of 2-methyl-2-pentenoyl chloride, rapidly, dropwise, over a period of approximately one minute, resulting in a temperature rise of from 25° to 37°C and precipitation of a white solid, sodium chloride.

The reaction mass is analyzed by GLC analysis after five minutes and thirty minutes and both analyses show that the same material has been produced (GLC conditions: 8' × ¼inch SE-30, programmed 130 to 225°C at 6°/minute; flow rate-50 ml/min.)

The reaction mass is then stirred for a period of one hour at room temperature. The solids formed in the mass are removed by means of gravity filtration and the resulting filtrate is concentrated in vacuo to a reddish orange liquid weighing 5.2 g. This major material is trapped using GLC. Mass spectral, NMR and IR analyses indicate that the resultant material is 2,5-dimethyl-3-thiol-(2-methyl pentenoyl) furan having the structure:

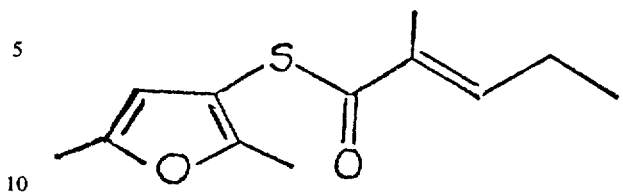

Mass Spectral Analysis: Molecular Ion, then decreasing intensity: 224, 97, 41, 43, 60, 30, 127.

NMR Analysis (CDCl₃):

| Signal | Interpretation |
|---|---|
| 1.06 (t,3) | CH₂—CH₃ |
| 1.92 (s,3) | CH₃ |
| 2.17 (s,3) | O — |
| 2.22 (s,3) | S  CH₂ |
| 2.20 (m,2) | O · CH₃ |
| 5.84 (s,1) | H₃C  CH₃  H |
| 6.87 (t,1) ppm | CH₂  CH |

EXAMPLE XXVI

Preparation of 2-Methyl-3-thiopivaloyl Furan

Into a 25 ml, three-neck reaction flask equipped with reflux condenser, calcium chloride drying tube, magnetic stirrer and addition funnel, the following materials are added:

| i. | 2-methyl-3-furanthiol | 1.14g(0.01 moles) |
|---|---|---|
| ii. | Diethyl ether | 10 ml |

The contents of the flask are stirred for a period of five minutes at which time 0.79 g (0.01 moles) of dry, distilled pyridine is added. After the completion of the pyridine addition, 1.20 g (0.01 moles) of pivaloyl chloride is added, dropwise, from the addition funnel, over a period of one minute. At that point a pyridine hydrochloride precipitate is formed. The reaction mass is then stirred for a period of 45 minutes after which time it is heated to reflux (37°C) for a period of 1 hour. At the end of this time, GLC analysis indicates that the reaction is 80% complete. The reaction mass consists of a solid and liquid. The solid is removed by vacuum filtration, and the filtrate is concentrated in vacuo into a pale-yellow liquid weighing 1.5 g. The major material is trapped using GLC and analyzed using mass spectral, NMR and IR analyses to be 2-methyl-3-thiol-pivaloyl furan having the structure:

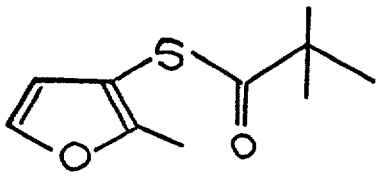

Mass Spectral Analysis: Molecular Ion, then in decreasing intensity: 198, 57, 114, 41, 29, 85, 39.

NMR Analysis:(CDCl₃)

| Signal | Interpretation |
|---|---|
| 1.27 (s,9) | CH₃ |
|  | —C—CH₃ |
|  | CH₃ |
| 2.19 (s, 3) | —CH₃ |
| 6.25 (d, 1) | H |
| 7.30 (d, 1) ppm | H |

EXAMPLE XXVII

Preparation of 2,5-Dimethyl-3-thiopivaloyl Furan

Into a 25 ml, three-neck reaction flask equipped with reflux condenser, calcium chloride drying tube, magnetic stirrer and addition funnel, the following materials are charged:

| i. | 2,5-Dimethyl-3-furanthiol | 1.28 g (0.01 moles) |
| ii. | Diethyl ester | 10 ml |

The contents of the flask are stirred for 4 minutes after which time 0.79 g of pyridine (0.01 moles) is added. After the pyridine addition, 1.20 g (0.01 moles) of pivaloyl chloride is added, dropwise, from the addition funnel, over a period of 1 minute. The reaction mass is then heated to reflux and maintained at reflux for a period of 1 hour (37°C) after which time the reaction mass is concentrated to an orange liquid weighing 2.5 g. The major component is isolated by GLC.

NMR, IR and mass spectral analyses yield the information that the resultant product is 2,5-dimethyl-3-thiopivaloyl furan, having the structure:

-continued

NMR Analysis: (CDCl₃)

| Signal | Interpretation |
|---|---|
| 2.15 (s, 3) |  |
| 2.22 (s, 3) |  |
| 5.84 (s, 1) ppm | H₃C   CH₃ <br> H |

EXAMPLE XXVIII

Preparation of 2,5-Dimethyl-3-thiohexanoyl Furan

Into a 100 ml, three-neck reaction flask equipped with reflux condenser, thermometer, magnetic stirrer and calcium chloride drying tube, the following materials are added:

| i. | 2,5-Dimethyl-3-furanthiol | 3.84 g (0.03 moles) |
| ii. | Diethyl ether (anhydrous) | 30 ml |

The contents of the flask are stirred for 5 minutes, after which time 2.37 g (0.03 moles) of pyridine is added. After the pyridine addition, 4.02 g (0.03 moles) of hexanoyl chloride is added, dropwise, over a period of 2 minutes. The reaction mass refluxes during the addition of the hexanoyl chloride. After the addition is complete, the reaction mass is stirred for a period of 1 hour at about 38°C. At the end of the 1 hour period, GLC analysis indicates that the reaction is virtually complete. The solid pyridine hydrochloride product is removed by suction filtration and the resulting filtrate is concentrated in vacuo to a reddish-orange liquid weighing 5.0 g. The major material present is isolated using GLC.

Mass Spectral, IR and NMR analyses yield the information that this material is 2,5-dimethyl-3-thiohexanoyl furan having the structure:

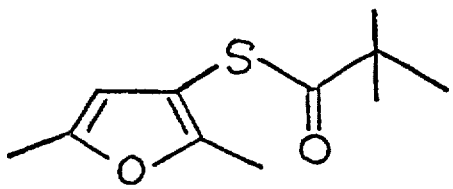

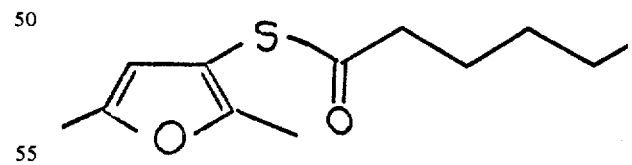

Mass Spectral Analysis: Molecular Ion, then in decreasing intensity: 212, 57, 128, 43, 212, 41, 127.

NMR Analysis: (CDCl₃)

| Signal | Interpretation |
|---|---|
| 1.26 (s, 9) | CH₃ |
|  | —C—CH₃ |
|  | CH₃ |

Mass Spectral Analysis: Molecular Ion, then in decreasing intensity: 226, 43, 128, 71, 99, 127, 41, 39, 226.

NMR Analysis (CDCl₃):

| Signal | Interpretation |
|---|---|
| 0.88 (t,3) | —CH₂CH₃ |
| 1.32 (m,4) | —CH₂CH₂—CH₂—CH₃ |
| 1.66 (m,2) | O |

NMR Analysis (CDCl₃):

| Signal | Interpretation |
|---|---|
| 2.16 (s,3) <br> 2.21 (s,3) | —C—CH₂—CH₂—CH₂— |
| 2.56 (t,2) | $\begin{matrix} H_3C & & CH_3 \\ & O & \end{matrix}$ |
| 5.84 (s,1) ppm | —C—CH₂—CH₂— <br> H |

EXAMPLE XXIX

The following formulation is prepared:

| Ingredient | Parts by Weight |
|---|---|
| Liquid hydrolyzed vegetable protein | 90 |
| 4-Methyl-beta-hydroxy-ethyl thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2,5-Dimethyl-3-thioacetyl furan | 2.00 |

The 2,5-dimethyl-3-thioacetyl furan causes the above formulation to be distinctly roast meat in character and in aroma and taste. It is typically gravy-like (roast meat gravy). The 2,5-dimethyl-3-thioacetyl furan also imparts a slight nutty note which can be associated with the roast meat gravy.

EXAMPLE XXX

The following formulation is prepared:

| Ingredient | Parts by Weight |
|---|---|
| Liquid hydrolyzed vegetable protein | 90 |
| 4-Methyl-beta-hydroxy-ethyl-thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2-Methyl-3-thioacetyl furan | 2.00 |

The 2-methyl-3-thioacetyl furan causes the above formulation to be distinctly roast meat in character and in aroma and taste causes it to be typically gravy-like (roast meat gravy). The 2-methyl-3-thioacetyl furan is stronger and consequently the flavor is more predominantly roast meat. The sweet and roast nut notes are very reminiscent of roast meat gravy.

EXAMPLE XXXI

The following formulation is prepared (butter flavor formulation):

| Ingredient | Parts by Weight |
|---|---|
| Diacetyl | 60.000 |
| Butyric acid | 250.000 |
| Caproic acid | 37.000 |
| Caprylic acid | 17.000 |
| 2,5-Dimethyl-3-thioisovaleryl furan | 0.004 |
| Acetyl propionyl | 2.500 |
| Methyl nonyl ketone | 0.100 |
| Cyclotene | 20.000 |
| Delta decalactone | 205.000 |
| Delta dodecalactone | 408.396 |

The 2,5-dimethyl-3-thioisovaleryl furan in the above butter flavor composition at 0.004% adds a sweet creaminess to the butter fullness. Flavoring margarine at 0.04% and approximately the same for baked products puts this application at 1 to 3 parts per billion.

EXAMPLE XXXII

In Royal instant vanilla pudding (ingredients: sugar and dextrose, precooked starch, sodium and calcium phosphates, salt, vegetable shortening, artifical flavor and color, vegetable monoglycerides, butylated hydroxy anisole, butylated hydroxy toluene, citric acid and corn oil; produced by Standard Brands, Inc., New York, New York) at 80 parts per billion (0.008 grams of 0.1% dilution of 2,5-dimethyl-3-thioisovaleryl furan in 100 grams of pudding) a panel evaluation (5 panelists) was performed. The panel of five agreed that the pudding was much sweeter with no off character than such pudding without the said 2,5-dimethyl-3-thioisolvaleryl furan. The panel of five also agreed that the general over-all aroma of the said pudding was enhanced as compared with the same pudding without the 2,5-dimethyl-3-thioisovaleryl furan.

EXAMPLE XXXIII

The following formulation is prepared (butter flavor formulation):

| Ingredient | Parts by Weight |
|---|---|
| Diacetyl | 60.000 |
| Butyric acid | 250.000 |
| Caproic acid | 37.000 |
| Caprylic acid | 17.000 |
| 2,5-Dimethyl-3-thioisovaleryl furan | 0.004 |
| Acetyl propionyl | 2.500 |
| Methyl nonyl ketone | 0.100 |
| Cyclotene | 20.000 |
| Delta decalactone | 205.000 |
| Delta dodecalactone | 408.396 |

The 2,5-dimethyl-3-thioisovaleryl furan in the above butter flavor composition at 0.004% adds a sweet creaminess to the butter fullness. Flavoring margarine at 0.04% and approximately the same for baked products puts this application at 1 to 3 parts per billion.

EXAMPLE XXXIV

A panel evaluation similar to that carried out in Example XIV was carried out on Royal instant chocolate pudding containing 2,5-dimethyl-thioisovaleryl furan at a level of 80 parts per billion. The five panelists agreed that the 2,5-dimethyl-thioisovaleryl furan has a definite blending and rounding off effect on the pudding flavor. In addition, two of the panelists thought that the 2,5-dimethyl-3-thioisovaleryl furan deepened the character of the cocoa itself and all five panelists agreed that the 2,5-dimethyl-3-thioisovaleryl furan improved the general flavor character of the chocolate pudding as compared to the same chocolate pudding without said 2,5-dimethyl-3-thioisovaleryl furan.

EXAMPLE XXXV

Preparation of 2-Propyl-3-thioacetyl Furan

A. Preparation of 2-Propyl-2,5-dimethoxy-2,5-dihydro Furan From 2Propyl Furan
  Reaction

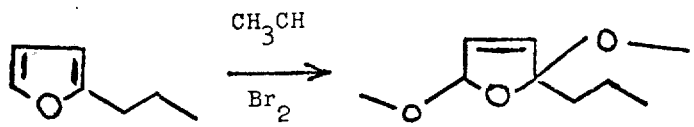

Into a 500 ml three-necked reaction flask equipped with mechanical stirrer, calcium carbonate drying tube and thermometer, the following materials are placed:

| i. | 2-Propyl furan | 25 0 g (0.227 moles) |
|---|---|---|
| ii. | Methanol, absolute | 180 ml |
| iii. | Sodium carbonate | 47.1 g (0.454 moles) |

The reaction mass is cooled to −10°C using a dry-ice acetone bath. Over a period of 20 minutes, a solution of 36.3 grams of bromine in 70 ml absolute methanol is added dropwise while maintaining the reaction mass at −12°C to −13°C. After the addition of the bromine solution, the reaction mass is stirred for 1.5 hours while maintaining same at −10°C.

The reaction mass is then mixed with 450 ml of saturated sodium chloride solution. The resulting mixture is suction filtered and the filter cake is washed with 100 ml of methylene dichloride. The resultant filtrate and washings are placed in a separatory funnel and the lower organic phase is drawn off. The aqueous phase is extracted with two 100 ml portions of methylene dichloride and the organic solutions are combined. The organic solution is then dried over anhydrous sodium sulfate and filtered; and then concentrated in vacuo to a yellow liquid weighing 32.7 grams. The major peak of this material determined by GLC contains 2-propyl-2,5-dimethoxy-2,5-dihydro furan (GLC conditions: F and M 5750; 8' × ¼ inch; SE-30; 130 225°C per min., flow rate - 80 ml/minute, chart speed 0.25 inch per minute).

B. Preparation of 4-Oxo-2-heptenal
  Reaction

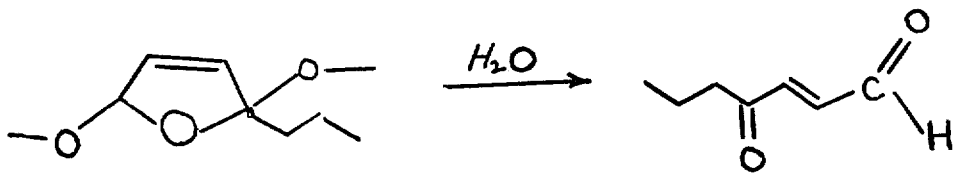

Into a 250 ml three-necked reaction flask equipped with mechanical stirrer and thermometer the following materials are added:

| i. | 2-Propyl-2,5-dimethoxy 2,5-dihydrofuran prepared according to the process of Part A | 32.7 g (0.16 moles) |
|---|---|---|
| ii. | Water (distilled) | 325 ml |

The reaction mass is stirred for a period of 4 hours at 24°C. At the end of this period of time, the reaction mass exists in two phases: an aqueous upper phase, and an organic lower phase. The aqueous upper phase is decanted and placed in a 1 liter vessel for the following reaction C. C. Reaction of 4-Oxo- Heptenal with Thioacetic Acid Reaction

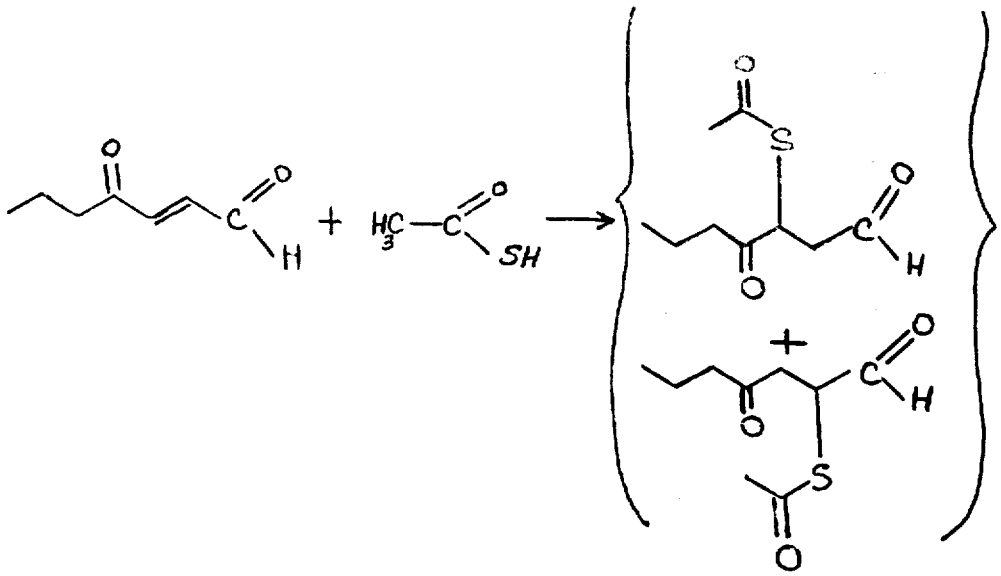

To the stirred aqueous solution produced in Part B, supra, of 4-oxo-2-heptenal is added 0.4 ml piperidine. After the piperidine addition, 12.4 grams of thioacetic acid is added to the reaction mass over a period of 4 minutes while maintaining the reaction mass at a temperature in the range of 27°–32°C. After the thioacetic acid addition is complete, the reaction mass is stirred for 1.5 hours. The reaction mass is then placed in a separatory funnel and extracted with 100 ml of methylene dichloride. The methylene dichloride solution is then separated, dried over anhydrous sodium sulfate and concentrated to an orange oil weighing 23.8 grams. This orange oil is analyzed using GLC and determined to contain two isomers having the above structures.

Mass Spectral Analysis of Trap I: Molecular Ion, then in decreasing intensity: 202, 43, 28, 71, 55, 41, 97, 83 m/e.

Mass Spectral Analysis of Trap II: Molecular Ion, then in decreasing intensity: 202, 28, 43, 71, 99 m/e.

D. Preparation of 2-Propyl-3-thioacetyl Furan
Reaction

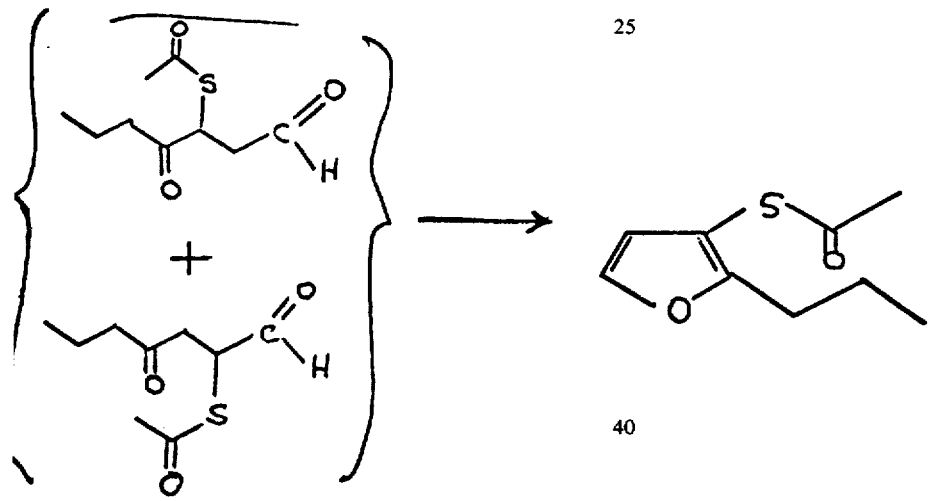

Into a 500 ml flask, equipped with reflux condenser, calcium chloride drying tube, mechanical stirrer, thermometer and addition funnel, the following materials are placed:

| i. | Isopropenyl acetate | 175 ml |
| ii. | Concentrated sulfuric acid | 0.5 ml |

The mass is heated to reflux (93°C) and, over a period of 20 minutes, while maintaining the reaction mass temperature at 91°–93°C, a solution of 23.0 grams of the reaction product of Part C in 25 ml of iospropenyl acetate is added from the addition funnel to the reaction mass with stirring. The reaction mass is then stirred and maintained at 91°C for a period of 30 minutes at which point 5.0 grams of sodium bicarbonate is added to the mass.

The isopropenyl acetate cyclization agent is then distilled off at a pot temperature of 80°C and a head temperature of 50°C at 60 mm Hg pressure. The resulting residue is admixed with 50 ml benzene and 50 ml water. The resulting mixture is placed into a separatory funnel and the layers are separated. The benzene layer is filtered through anhydrous sodium sulfate and is then concentrated in vacuo to a brown liquid weighing 5.0 grams. This liquid is distilled through a short path microdistillation apparatus at 100°–103°C and 0.3 mm Hg pressure, yielding 2-propyl-3-thioacetyl furan as confirmed by mass spectral and NMR analysis.

Mass Spectral Analysis: Molecular Ion, then in decreasing intensity: 184, 113, 43, 142, 27, 184.

NMR Analysis (CDCl$_3$)

| Signal | Interpretation |
|---|---|
| δ 1.01 (t,3) | CH$_2$CH$_3$ |
| 1.65 (m,2) | CH$_2$CH$_2$CH$_3$ |
| 2.36 (s,3) | $\underset{O}{\overset{\parallel}{-C}}-CH_3$ |
| 2.59 (t,2) | |
| 6.32 (d,1) | CH$_2$—CH$_2$ H |
| 7.35 ppm (d,1) | H H |
| | H |

EXAMPLE XXXVI

Preparation of 2-Methyl-3-thioisobutylfuran

A mixture of 1.0 g of 2-methyl-3-furanthiol, 0.70 g of pyridine and 10 ml of diethyl ether is placed in a flask and 0.93 g of iosbutyryl chloride is added. After standing 30 minutes, the resulting mixture is filtered and the filtrate concentrated in vacuo to a greenish yellow oil weighing 1.0 g. The product is isolated by preparative GLC. NMR, IR and mass spectral analysis confirmed the structure of the product as 2-methyl-3-thioisobutyryl furan.

Mass Spectrum: Parent Ion, then decreasing intensity: 184, 71, 43, 41, 114, 113 m/e.

NMR Spectrum (CDCl$_3$): 7.31 (d,1); 6.28 (d,1); 2.83 (m,1); 2.21 (s,3) and 1.23 (d,6) ppm.

What is claimed is:

1. A process for altering the organoleptic properties of a foodstuff which comprises adding to said foodstuff from 0.02 up to 250 ppm of a 3-furyl thioester compound selected from the group consisting of:

2,5-dimethyl-3-thio(2-ethylbutyryl) furan; 2-methyl-3-thio(2-ethylbutyryl) furan; and 2,5-dimethyl-3-thio(2-methylbutyryl) furan in order to impart to said foodstuff a meaty aroma and taste.

2. The process for altering the flavor of a foodstuff of claim 1 wherein the 3-furyl thioester compound is 2,5-dimethyl-3-thio(2-ethylbutyryl) furan.

3. The process for altering the flavor of a foodstuff of claim 1 wherein the 3-furyl thioester compound is 2-methyl-3-thio(2-ethylbutyryl) furan.

4. The process for altering the flavor of a foodstuff of claim 1 wherein the 3-furyl thioester compound is 2,5-dimethyl-3-thio(2-methylbutyryl) furan.

* * * * *